(12) United States Patent
Brandes et al.

(10) Patent No.: US 9,244,452 B2
(45) Date of Patent: Jan. 26, 2016

(54) CONFIGURATION AND MONITORING VIA DESIGN DIAGRAM REPRESENTATION

(71) Applicant: Rockwell Automation Technologies, Inc., Mayfield Heights, OH (US)

(72) Inventors: Russell Brandes, Brunswick, OH (US); Michael W. Rudder, Kirtland, OH (US); Dale E. Reed, Cleveland Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 446 days.

(21) Appl. No.: 13/667,776

(22) Filed: Nov. 2, 2012

(65) Prior Publication Data

US 2014/0129002 A1 May 8, 2014

(51) Int. Cl.
*G05B 15/00* (2006.01)
*G05B 19/042* (2006.01)

(52) U.S. Cl.
CPC .................. *G05B 19/0426* (2013.01)

(58) Field of Classification Search
CPC .... G05B 19/00; G05B 19/04; G05B 19/0426; G06F 9/00; G06F 3/048
USPC ......................................... 700/17, 18, 83, 86
See application file for complete search history.

(56) References Cited

U.S. PATENT DOCUMENTS

| | | | | |
|---|---|---|---|---|
| 5,576,946 | A | | 11/1996 | Bender et al. |
| 5,812,394 | A | * | 9/1998 | Lewis et al. .................. 700/17 |
| 5,828,851 | A | * | 10/1998 | Nixon et al. ................. 710/105 |
| 5,838,563 | A | * | 11/1998 | Dove et al. ..................... 700/83 |
| 6,032,208 | A | * | 2/2000 | Nixon et al. ................... 710/64 |
| 6,195,591 | B1 | * | 2/2001 | Nixon et al. ................... 700/83 |
| 6,266,726 | B1 | * | 7/2001 | Nixon et al. ................. 710/105 |
| 6,477,435 | B1 | * | 11/2002 | Ryan et al. ..................... 700/86 |
| 6,754,885 | B1 | * | 6/2004 | Dardinski et al. ........... 717/113 |
| 6,868,538 | B1 | | 3/2005 | Nixon et al. |
| 7,096,465 | B1 | * | 8/2006 | Dardinski et al. ........... 717/178 |
| 7,376,472 | B2 | * | 5/2008 | Wojsznis et al. ............... 700/29 |
| 7,468,731 | B2 | * | 12/2008 | Eldridge et al. ............. 345/581 |
| 7,668,608 | B2 | * | 2/2010 | Nixon et al. ................... 700/87 |

(Continued)

FOREIGN PATENT DOCUMENTS

GB 2472682 A 2/2011

OTHER PUBLICATIONS

European Search Report dated Mar. 6, 2014 for European Application No. 13191340.2-1802, 5 pages.

*Primary Examiner* — Charles Kasenge
(74) *Attorney, Agent, or Firm* — Amin, Turocy & Watson, LLP

(57) ABSTRACT

A design diagram representation for an industrial operator interface that combines configuration and presentation aspects is provided. The design diagram representation illustrates state transitions, interlocks, and/or permissives for an industrial process or device as a dataflow diagram, a state diagram, or other such diagrams, and renders live state information for the process or device as numeric indicators, string indicators, color-animated state icons, and the like. Flow lines of the diagram are highlighted based on the displayed state information to convey an overall status of the process. In addition, the design diagram representation includes one or more data fields that allow an operator to modify or set a numeric variable for the industrial process (e.g. a timer, a setpoint, etc.), thereby allowing the industrial process to be viewed and configured using a single interface.

20 Claims, 13 Drawing Sheets

(56) References Cited

U.S. PATENT DOCUMENTS

| | | | |
|---|---|---|---|
| 7,702,409 B2* | 4/2010 | Lucas et al. | 700/96 |
| 8,056,056 B2* | 11/2011 | Eldridge et al. | 717/121 |
| 8,060,862 B2* | 11/2011 | Eldridge et al. | 717/121 |
| 2005/0172258 A1* | 8/2005 | Nixon et al. | 717/100 |
| 2007/0240067 A1* | 10/2007 | Eldridge et al. | 715/762 |
| 2009/0055457 A1* | 2/2009 | Miller | 708/300 |
| 2009/0118845 A1* | 5/2009 | Eldridge et al. | 700/86 |
| 2009/0118846 A1* | 5/2009 | Eldridge et al. | 700/86 |
| 2009/0125128 A1* | 5/2009 | Eldridge et al. | 700/86 |
| 2009/0125129 A1* | 5/2009 | Eldridge et al. | 700/86 |
| 2009/0125130 A1* | 5/2009 | Eldridge et al. | 700/87 |
| 2009/0125131 A1* | 5/2009 | Eldridge et al. | 700/87 |
| 2009/0132996 A1* | 5/2009 | Eldridge et al. | 717/108 |
| 2009/0210071 A1 | 8/2009 | Agrusa et al. | |
| 2009/0327942 A1* | 12/2009 | Eldridge et al. | 715/771 |
| 2010/0223593 A1* | 9/2010 | Eldridge et al. | 717/105 |
| 2011/0040390 A1* | 2/2011 | Blevins et al. | 700/18 |
| 2011/0144776 A1* | 6/2011 | Hollender et al. | 700/49 |
| 2012/0041570 A1* | 2/2012 | Jones et al. | 700/17 |

\* cited by examiner

CONFIGURATION AND MONITORING VIA DESIGN DIAGRAM REPRESENTATION

TECHNICAL FIELD

The subject application relates generally to industrial automation, and, more particularly, to systems and methods for monitoring and configuring an industrial process using a design diagram representation of an operator interface.

BACKGROUND

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures. The controller receives any combination of digital, analog, or networked data signals from the field devices indicating current states of the process (e.g., temperature, position, part presence or absence, fluid level, etc.), and executes the control program to automate decision-making for the process based on the received signals. The controller then outputs appropriate digital, analog, or networked control signaling to the field devices in accordance with the decisions made by the control program. These outputs can include device actuation signals, temperature or position control signals, motion control commands, commands to machining or material handling robots, and the like.

To facilitate operator interaction with the industrial controller (and with the processes controlled thereby), industrial control systems often include at least one operator interface (e.g., a human-machine interface or other such visualization system) that communicates with the industrial controller and visualizes data therein on one or more user-developed or pre-configured display screens.

Some industrial processes, such as Proportional+Integral+Derivative (PID) controlled systems, dynamically adjust a control output (e.g., a position of a motion controlled device, a temperature, a flow valve position, etc.) in view of a current state of the controlled variable and one or more other process variables. Other systems or sub-systems operate according to a predefined control sequence, in which certain actions (e.g., motor start-ups) are initiated or allowed to initiate only after a series of process steps take place in a defined order. Such sequence based control may include steps that compare a process variable with a preconfigured setpoint value, or steps requiring a particular process state to have been true for a predefined duration of time before the next step in the sequence is initiated. Such controlled systems typically leverage both measured process variables (e.g., metered values read from field devices, sensor outputs, etc.) as well as user-configured variables such as timer values, alarming setpoints, target setpoints, and the like.

In many systems, configuration of user-adjustable process variables and presentation of real-time process states are separate, non-integrated functions. For example, changes to user-configurable aspects of a PID or sequence-controlled process are made in the industrial controller (e.g., through a controller programming interface.). Once these settings have been configured and the control program has been deployed, the states of the running process—which are often dependent on the previously configured user-settable variables—are rendered on the operator interface. If an operator or developer wishes to modify a process parameter to see the result on the live process, the user must make the adjustment in the controller then return to the operator interface display to see the results of the parameter change. In addition, to learn how the system and its functions are designed and how they behave, the operator or developer must refer to separate online or hardcopy documentation or help files.

The above-described deficiencies of today's industrial control and business systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

One or more embodiments of the present disclosure relate to configurable design diagram representations of industrial process controls. These design diagram representations can comprise dataflow diagrams, state diagrams, or other diagrams that also present near real-time state or transition information for the process. The representations can also include data entry fields that allow an operator to modify process parameters (e.g., time delay values, setpoint values, etc.) during runtime, thereby combining functional presentation, real-time state presentation, and real-time parameter configuration on a single graphical representation.

In some embodiments, a library of design diagram templates can be provided for use in an operator interface development environment, allowing interface developers to select suitable device-specific or process-specific design diagram templates, which can then be mapped to the appropriate data structures in the industrial controller (e.g., controller tags, function blocks, control modules, etc.). The design diagram templates can also be invoked during runtime using vendor-provided faceplate graphics included as part of the operator interface environment.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
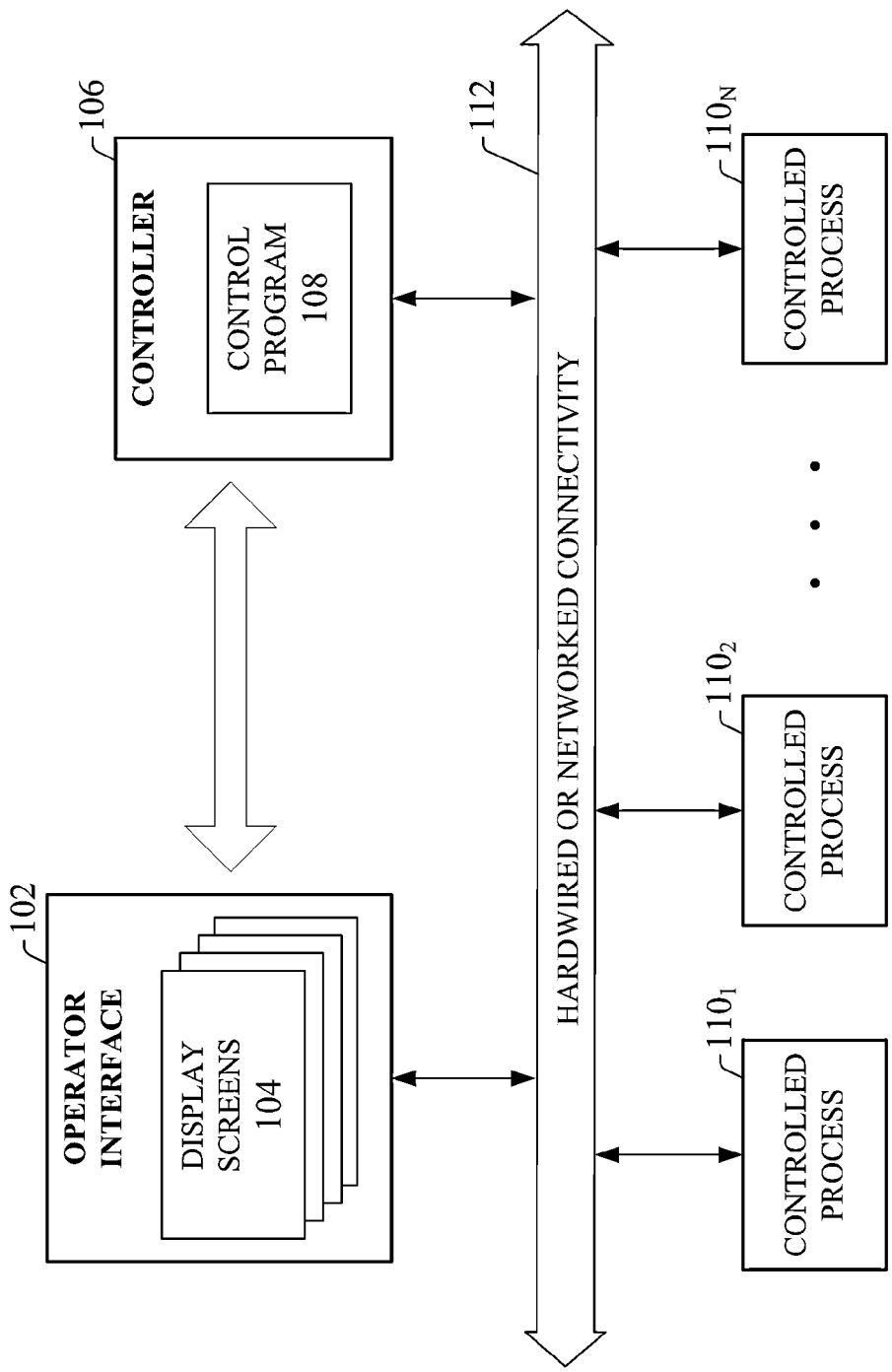
FIG. 1 is a high-level overview of an exemplary, generalized control environment in which interactive design diagram interfaces can be used.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 illustrates an exemplary, generalized control environment in which the design diagram representations of this disclosure can be used. An industrial facility can comprise one or more controlled processes $110_1$-$110_N$ relating to product manufacture, batch processing, material handling, or other such industrial functions. Controlled processes $110_1$-$110_N$ can be monitored and controlled by at least one controller 106. Controller 106 can comprise an industrial controller, such as a programmable logic controller (PLC) or other such programmable automation controller (PAC), that executes a control program 108 to facilitate monitoring and control of controlled processes 110$_1$-110$_N$. Controller 106 may also comprise a soft controller executed on a personal computer or other hardware platform. Control program 108 can comprise any conceivable type of code used to process input signals read into the controller 106 and to control output signals from the controller, including but not limited to ladder logic, sequential function charts, function block diagrams, or structured text. Data read into or generated by controller 106 can be stored in memory addresses within controller memory, which can comprise native memory or removable storage media.

Controller 106 can communicatively interface with controlled processes 110$_1$-110$_N$ over hardwired or networked connections 112. For example, controller 106 can be equipped with native hardwired inputs and outputs that communicate with one or more field devices associated with the controlled processes 110$_1$-110$_N$ to effect control of the devices. The native controller I/O can include digital I/O that transmits and receives discrete voltage signals to and from the field devices, or analog I/O that transmits and receives analog voltage or current signals to and from the devices. The controller I/O can communicate with the controller's processor over a backplane such that the digital and analog signals can be read into and controlled by the control programs. Controller 106 can also communicate with field devices over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. It is to be appreciated that controller 106 is not limited to the above specifications, and can include virtually any type of controller used to control an industrial process.

The system can also include at least one operator interface 102 (e.g., a human-machine interface, or HMI) communicatively coupled with controller 106 (e.g., via network 112). Operator interface 102 can exchange data with controller 106 to facilitate visualization of information relating to controlled processes 110$_1$-110$_N$ and to allow an operator to submit data to controller 106 in the form of issued commands (e.g., cycle start commands, device actuation commands, etc.), setpoint values, and the like. Operator interface 102 can include one or more display screens 104 through which the operator interacts with the controller 106, and thereby with the controlled processes 110$_1$-110$_N$. Exemplary display screens can visualize present states of the controlled processes 110$_1$-110$_N$ using graphical representations of the processes that display metered or calculated values, employ color or position animations based on state, render alarm notifications, or employ other such techniques for presenting relevant data to the operator. Data presented in this manner is read from controller 106 by operator interface 102 and presented on one or more of the display screens 104 according to display formats chosen by the system developer.

Figure 2:
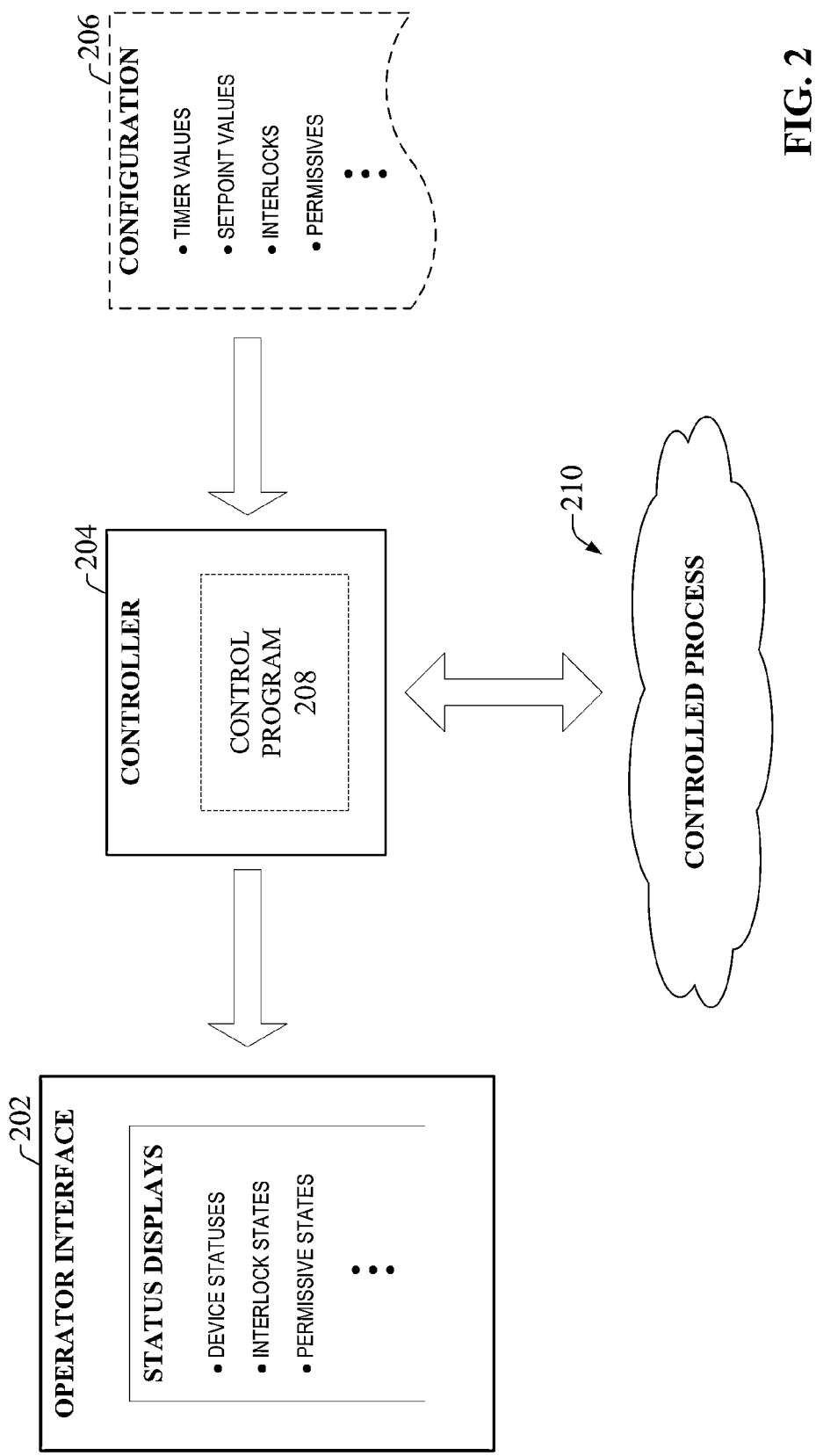
FIG. 2 is a block diagram illustrating configuration of process parameters via a programming interface and presentation of the process on an operator interface.

In many industrial control systems, configuration of an industrial process, such as a control sequence or a feedback-controlled process, is separated from presentation of the real-time states of the process during runtime. This is illustrated in FIG. 2, which depicts process configuration and presentation for an exemplary controlled process 210. Industrial controller 204 runs control program 208 to facilitate monitor and control of controlled process 210. Prior to deployment (or during debug), a system designer provides configuration data 206 to the control program 208 to configure the parameters that determine how the process is controlled. The configuration data 206 can include timer values (e.g., delays, timeouts, etc.), setpoint values, and any interlocks or permissives that act as conditions for triggering various states within the process. System developers typically provide this configuration data via a control program development interface that couples to the controller 204 and allows the developer to modify process parameters by writing new values directly to the appropriate controller tags representing the parameters. In some systems, parameter modification is performed using a tabular interface that lists the controller tags and their respective values in writable data fields.

The running process is visualized on operator interface 202 (e.g., an HMI application running on an operator interface terminal). Operator interface 202 can render, for example, device or machine statuses, interlock and permissive states that may be preventing execution of a process step, or other states of the controlled process 210.

Using the configuration of FIG. 2, if it is decided that a control parameter should be modified during runtime, a developer must enter the new configuration data 206 via the control program interface then return to the operator interface 202 to view the results of the change. Moreover, the configuration of FIG. 2 does not provide a convenient method for documenting the control parameter configuration in a manner that clearly conveys the relationships between the user-defined process variables and the process state flow.

Figure 3:
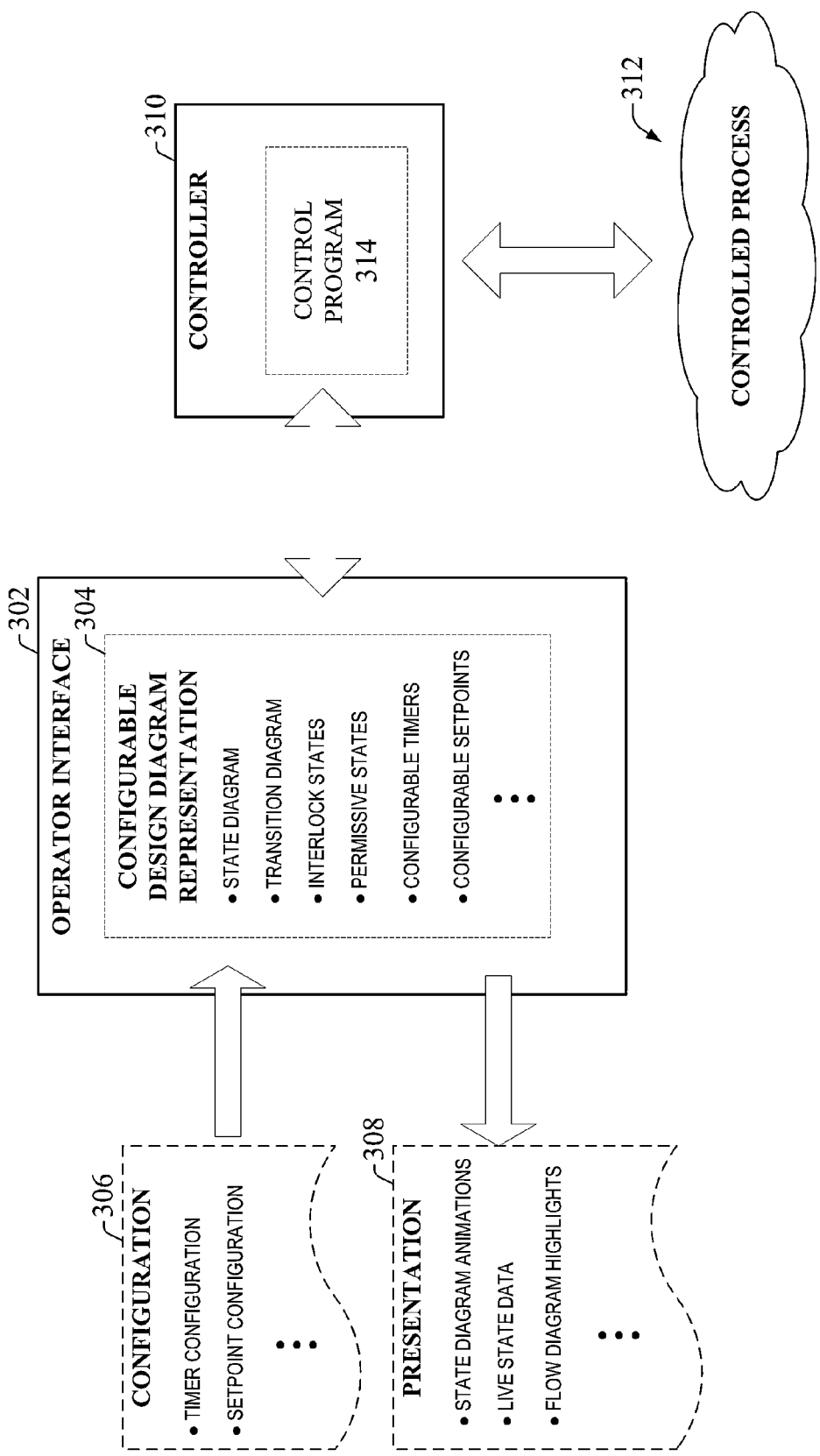
FIG. 3 is a block diagram illustrating configuration and presentation of an industrial process using a configurable design diagram representation.

To address these and other issues, one or more embodiments of this disclosure provide configurable design diagram representations that combine configuration and presentation of a process state flow. FIG. 3 illustrates a general configuration that uses such configurable design diagram representations. As in the example described above, a controlled process 312 is controlled by an industrial controller 310 running control program 314. An operator interface 302 visualizes the process by rendering data values read from the controller 310. In this example, operator interface 302 is configured to render a configurable design diagram representation 304 that provides for both visualization of real-time process states as well configuration of process parameters that can affect the process states. For example, configurable design diagram representation 304 can include, but are not limited to, dataflow diagrams or state-transition diagrams (STDs) that convey how the process works (e.g., what conditions are required in order for a particular sequence step to be performed). The design diagram representation 304 can include live state animations that convey current state information for the process (e.g., process variable values, control output values, sequence step statuses, etc.). Configurable design diagram representation 304 can also include configurable fields that allow the operator to modify certain selected process parameters, including but not limited to timer values and setpoint values. Thus, the configurable design diagram representation 304 can accept configuration data 306 from the operator, and provide presentation data 308 to the operator through a single interface.

Figure 4:
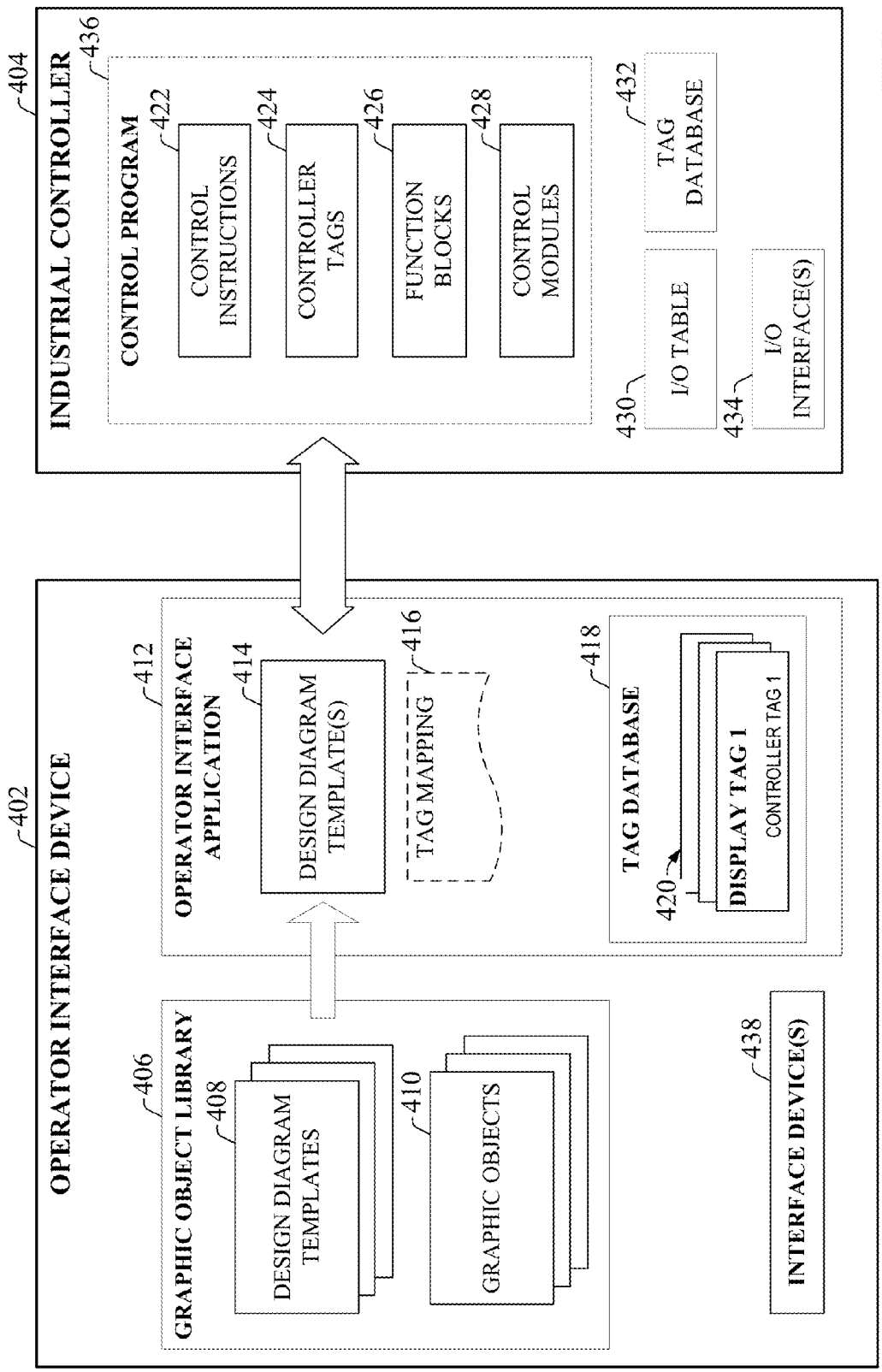
FIG. 4 is a block diagram illustrating exemplary components of an operator interface and an industrial controller that facilitate display of industrial process states on a configurable design diagram representation.

In one or more embodiments, design diagram representations can be provided as part of a library of graphical objects available in an operator interface development environment. For example, a graphic object library can include selectable vendor-provided or user-developed design diagram templates respectively designed to visualize a particular device or process type. FIG. 4 illustrates an exemplary operator interface environment and its interactions with an industrial controller in more detail. As in previous examples, industrial controller 404 executes a control program 436 to facilitate monitor and control of an industrial process. Controller 404 can include one or more I/O interfaces 434 that provide hardwired or networked connectivity to the controlled equipment and telemetry devices comprising the controlled industrial process. These I/O interfaces can include, for example, digital and/or analog input modules, digital and/or analog output modules, networking modules, or the like. An I/O table 430 within the controller's memory can maintain present analog and digital values of the various inputs and outputs read from or written to the I/O interfaces 434. That is, data values read from field devices by I/O interfaces 434 (e.g., analog or digital input modules) can be written to the I/O table 430. These input values can then be read by control program 436 which updates its control variables accordingly. Similarly, output values generated by the control program 436 can be written to I/O table 430, causing corresponding output data signals to be applied to the analog or digital output modules comprising the I/O interfaces 434.

Control program 436 can include a number of control data structures that perform data handling and instruction processing functions within the program. Exemplary data structures can include control instructions 422, controller tags 424 of various data types, function blocks 426, and/or control modules 428. During program development, the control instructions 422, function blocks 426, and/or control modules 428 can be selected from a set of control instructions available within the programming platform. These can include generalized instructions (e.g. timer blocks, counters, etc.) and industry-specific control instructions (e.g., PID instructions for process control applications, pulse multiplier instructions for motor drive control applications, axis control instructions for motion control applications, etc.). Controller tags 424 are data structures that reference a data item or memory location within the controller (e.g., an input value, an output value, or an internal data register). A controller tag can be configured to be of a specified data type, such as binary, floating point, integer, double integer, string, etc. During development, controller tags can be created and maintained in a tag database 432.

According to one or more embodiments of the present disclosure, some control data structures can also represent particular devices being monitored and/or controlled by controller 404. For example, a given control data structure may represent a motor or associated motor drive, and can comprise multiple parameters or tags representing the drive's current operational statuses, parameter values, configuration settings, or other state information for the motor or drive. These device statuses can be read from the control data structure by control program 436 and used to facilitate automated decision making in connection with control of the controlled industrial process.

Operator interface application 412 running on operator device 402 facilitates operator interaction with controller 404 (e.g., via a network), visualizing control data associated with the controlled process and allowing an operator to submit control inputs into the system. Operator interface application 412 can comprise one or more display screens, each display screen containing static and/or dynamic content that conveys current states of the controlled process. Display screen content can include one or more graphic objects for rendering numeric, string or graphical data on the display screens. Some graphic objects can comprise dynamic display objects configured to change visual state in accord with control data read from the controller 404. Such graphic objects can include numerical display objects that render a value of a control register read from the controller, bar or line graphs that display a trend of one or more data registers over time, animated graphical icons representing field devices or equipment that alter their appearance to convey a current state of the devices, or other such elements. One or more graphic objects can also encode functionality that allows an operator to enter a value to be written to a control register within the controller 404 (e.g., a setpoint value) or to set/reset a bit within the controller (e.g. issue a start or stop command to a device via the control program). Operators can interact with the display screens and their respective graphic objects via the operator terminal's interface devices 438, which can include one or more of a mouse, a keyboard, a touch screen, voice recognition receiver, or other suitable interface devices In some operator interface systems, data objects are represented by display tags 420 maintained in a tag database 418. In the present example, each of the display tags 420 is configured to map to a particular controller tag (e.g., in the controller's tag database 432), thereby creating an instance of the value of the controller tag in the operator interface environment that can be used in connection with building displays screens. Linkages between a graphic object in the operator interface application 412 and a particular controller tag can be configured using tag mappings 416 that define associations between graphic objects and display tags 420. These tag mappings can be configured within the graphic objects themselves during development of the operator interface application 412. For example, a valve control graphic object can include an OPEN pushbutton portion linked to a command bit in control program 436, and a state color animation linked to a corresponding "valve open" status register in the control program 436.

The operator interface development environment can include a graphic object library 406 that maintains a library of graphic objects 410 that can be selected for inclusion on an operator interface screen during development of the operator interface application 412. According to one or more embodiments of this disclosure, graphic object library 406 can also include a number of design diagram templates 408 that can also be invoked from operator interface application 412. In some embodiments, design diagram templates 408 can be classified in the graphic object library 406 according to any suitable classification structure (e.g., according to industry type, device type, process type, etc.). Each design diagram template 408 can comprise a graphical diagram (e.g., a dataflow diagram, a state-transition diagram, or other such diagram) for a particular type of process, a particular device or machine, a set of conditions or interlocks associated with a particular process step, etc. For example, the graphic object library 406 can include a design diagram template for a motor overload detection that conveys the current states of the conditions that trigger detection of a motor overload condition (and any associated alarm indications).

Figure 5:
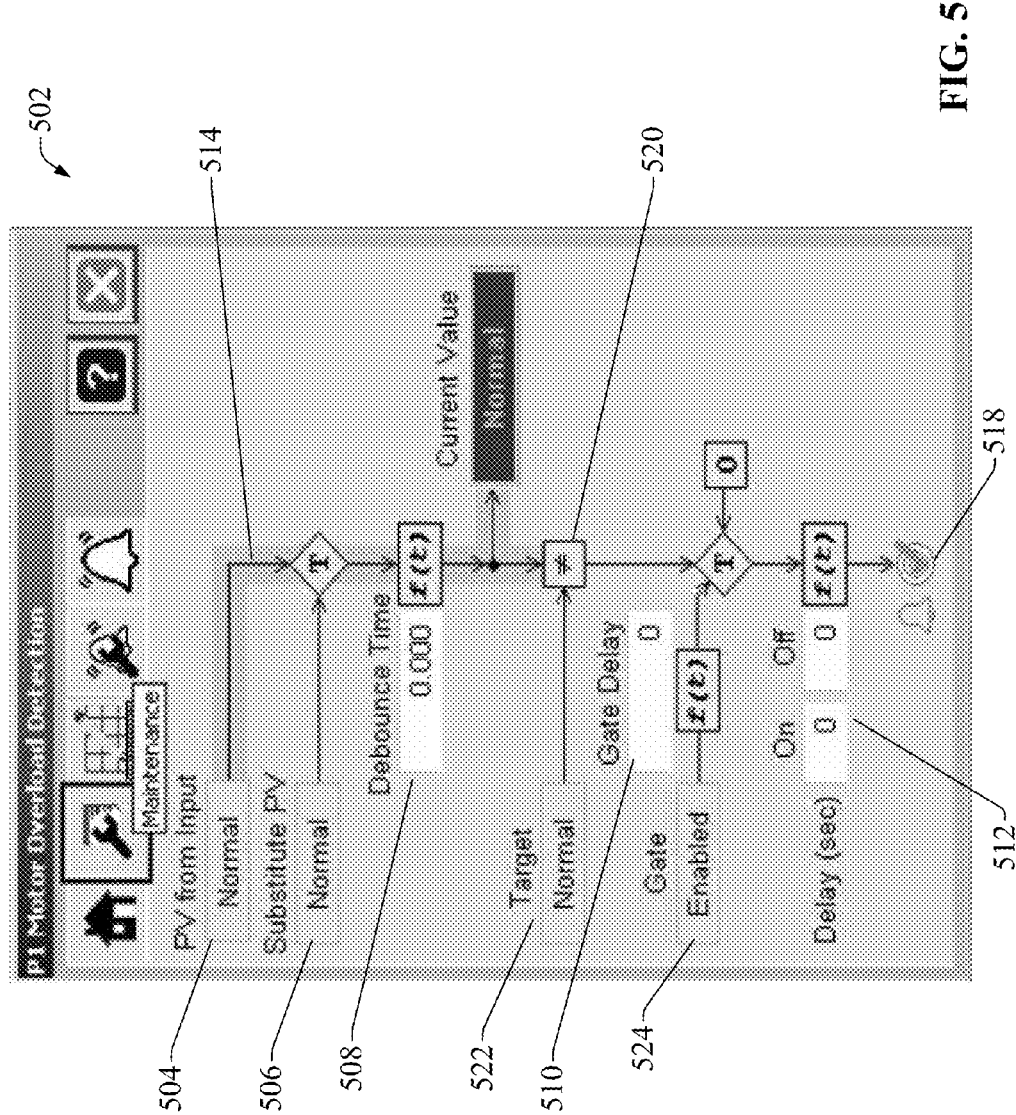
FIG. 5 illustrates an exemplary dataflow diagram representation for motor overload detection.

An example of such a design diagram representation is illustrated in FIG. 5. Design diagram representation 502 illustrates, in dataflow diagram form, the discrete and analog states that trigger a motor overload notification, including a measured process variable 504, a substitute process variable 506 (used to simulate the measured process variable during simulations), a target process variable 522, and a gate enabled/disabled state 524. Design diagram representation 502 also includes a number of operators (e.g., operator 520) that document how the various states are examined in order to determine the motor overload state (represented by icon 518). The process value, substitute process value, target, and gate states are read-only display values on exemplary design diagram representation 502, and display near real-time statuses of those states during runtime based on live data read from the industrial controller Animated highlights 514 indicate the current flow of status or data for each connecting line of the diagram, thereby graphically conveying the overall current state of the dataflow diagram in relation to the motor overload detection condition represented by icon 518.

In addition to these read-only state displays, design diagram representation 502 also includes a number of user-configurable values that can affect the state of the overload detection status. These configurable values include a debounce time 508 defining the amount of time after a transition of state of the process variable 504 or substitute process variable 506 until a transition to the opposite state is recognized, a gate delay 510 specifying a delay time for the gate enabled/disabled state 524, and respective On and Off delay times 512 that define respective durations that the preceding segment of the diagram must be TRUE or FALSE before the motor overload detection icon 518 registers the change in status. Design diagram representation 502 allows the operator to modify these writable parameters directly on the dataflow diagram, causing the values to be written to the appropriate registers or data tags in the industrial controller. In this way, the operator can modify the configurable parameters directly on the design diagram representation 502 and see the result (if any) of the modification on the diagram.

In one or more embodiments, graphic object library 406 can include pre-developed, vendor-supplied design diagram representations (such as design diagram representation 502) for a number of common control sequences or devices. These vendor-supplied design diagram representations can embody common industry-specific rules and standards for a given type of industrial process or device. For example, a particular pharmaceutical batching process may be required to conform to a set of standards and regulations set forth for food and drug related processes. Accordingly, the library of design diagram templates 408 can include a class of templates for food and drug or pharmaceutical processes which conform to such industry-specific standards. In another example, operation of a certain class of motors may be required to conform to particular safety guidelines that dictate a safe motor starting sequence. To facilitate safe operation, the library of design diagram templates 408 can include a starting sequence diagram or dataflow diagram for such motors that is configured in accordance with the recommended safe starting sequence.

Figure 6:
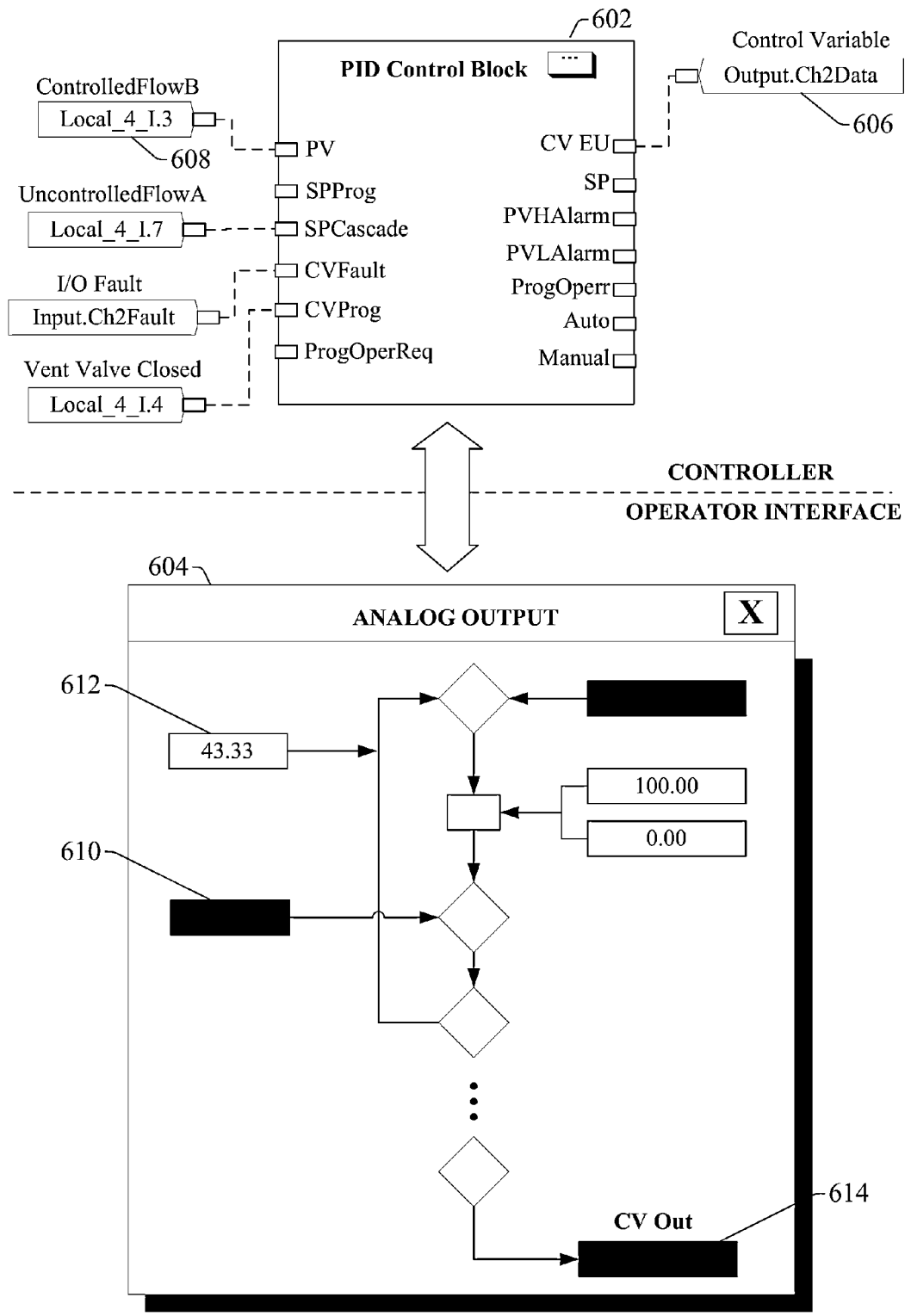
FIG. 6 illustrates mapping between a PID control block and a dataflow diagram representation for an analog output of a PID control loop.

When a design diagram template is incorporated into operator interface application 412 (e.g., design diagram template 414), the generic design diagram template 414 can be converted to an application-specific template by mapping the template to the appropriate controller tags 424, function blocks 426, or control modules 428 in industrial controller 404. These controller data structures provide the (near) real-time data used to populate the design diagram representations with live state data for the controlled process, and also receive the user configurable values provided by the operator via the design diagrams. FIG. 6 illustrates an exemplary mapping between a PID control block 602 in an industrial controller and design diagram representation 604 for an analog output generated by the PID control block. The PID control block 602 is a function block that executes in the industrial controller to regulate a control variable (CV) analog output of a PID control loop based on one or more process variables (PVs) measured from the controlled process. In this example, the control variable output 606 is mapped to an analog output that controls a flow valve, and the PV input 608 is mapped to an analog input to the controller that receives a transducer signal representing a measured flow through the valve being controlled. A number of other discrete and analog values are mapped to the PID control block 602 as additional parameters that determine the value of the control variable output 606.

On the operator interface side, an Analog Output design diagram representation 604 has been mapped to the PID control block 602. In one or more embodiments, the Analog Output design diagram representation 604 can be selected from a library of design diagram templates included in the graphic object library of the operator interface (e.g., design diagram templates 408 of FIG. 4). Mapping the generic design diagram template to the PID control block 602 in the controller causes the appropriate data values associated with the PID control block 602 to be rendered on design diagram representation 604, causing the generic template to be converted to an application-specific design diagram.

As with exemplary design diagram representation 502 illustrated in FIG. 4, design diagram representation 604 includes both read-only values 610 representing near real-time status data provided by the controller, and user-configurable parameter fields 612 that allow the operator to modify selected parameters of the PID control block 602. In response to receiving a manual modification to a value of one of the user-configurable parameter fields 612, the operator interface will write the new parameter value to the appropriate data tag of the controller based on the mapping between the design diagram representation 604 and the PID control block 602. Since the design diagram representation 604 renders the current status of the various control parameters and variables of the PID control loop, changes to the state of the PID control loop as a result of modifying a user-configurable parameter will be reflected in the design diagram status displays. The CV Out value 614 represents the current value of the analog CV output calculated by the PID control block (corresponding to the value mapped to the controller's analog output).

Figure 7:
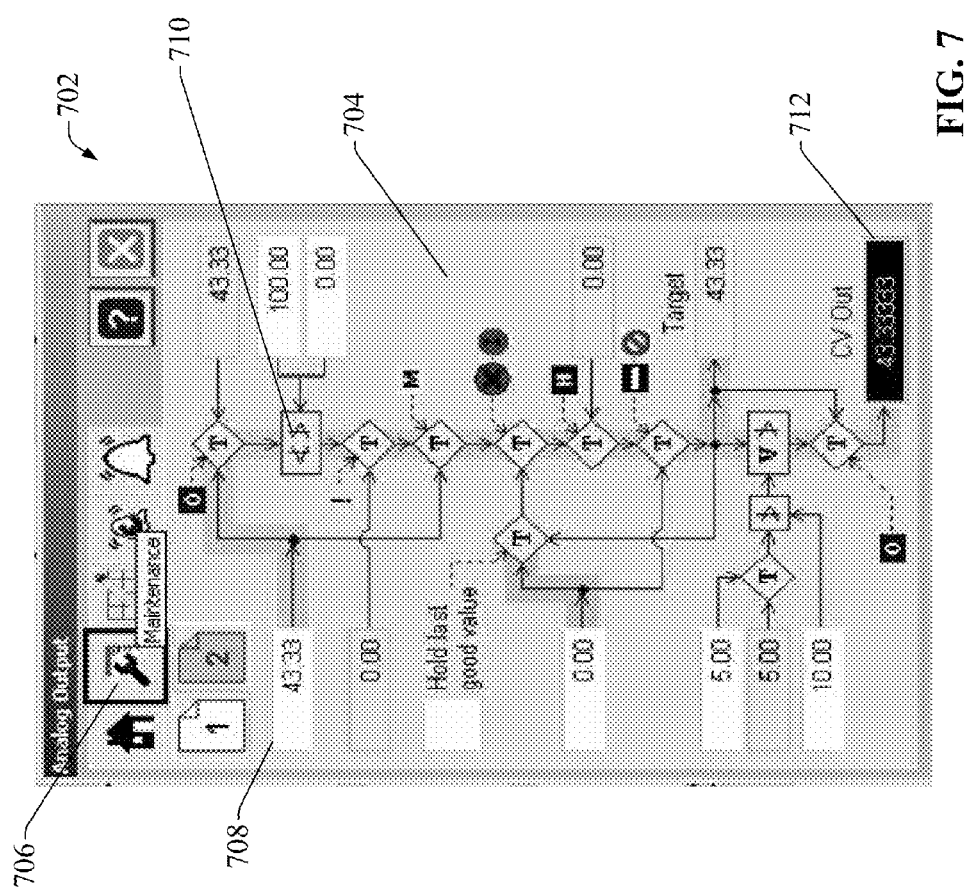
FIG. 7 illustrates an exemplary dataflow diagram representation for an analog output.

FIG. 7 illustrates an exemplary Analog Output design diagram representation 704 in more detail. In this example, design diagram representation 704 is accessible via a maintenance tab 706 of a display window 702 invoked on the operator interface. Display window 702 may be invoked, for example, by selecting a graphic object representing the flow valve being controlled. Design diagram representation 704 is formatted as a dataflow diagram that renders the current value of the control variable analog output 712 being sent to the flow valve, as well as various measured and calculated process variables used to derive the current value of the control variable analog output 712. The displayed process variables include a number of configurable values 708 that can be modified via the design diagram representation 704. These user-configurable values include an Override Mode CV target, a Hand Mode CV target, a Program Mode rate of change limit, an Operator Mode rate of change limit, and a maximum allowed rate of change limit. The operators 710, displayed process variables, and animation highlights convey to the operator how the current control variable analog output 712 was determined.

Figure 8:
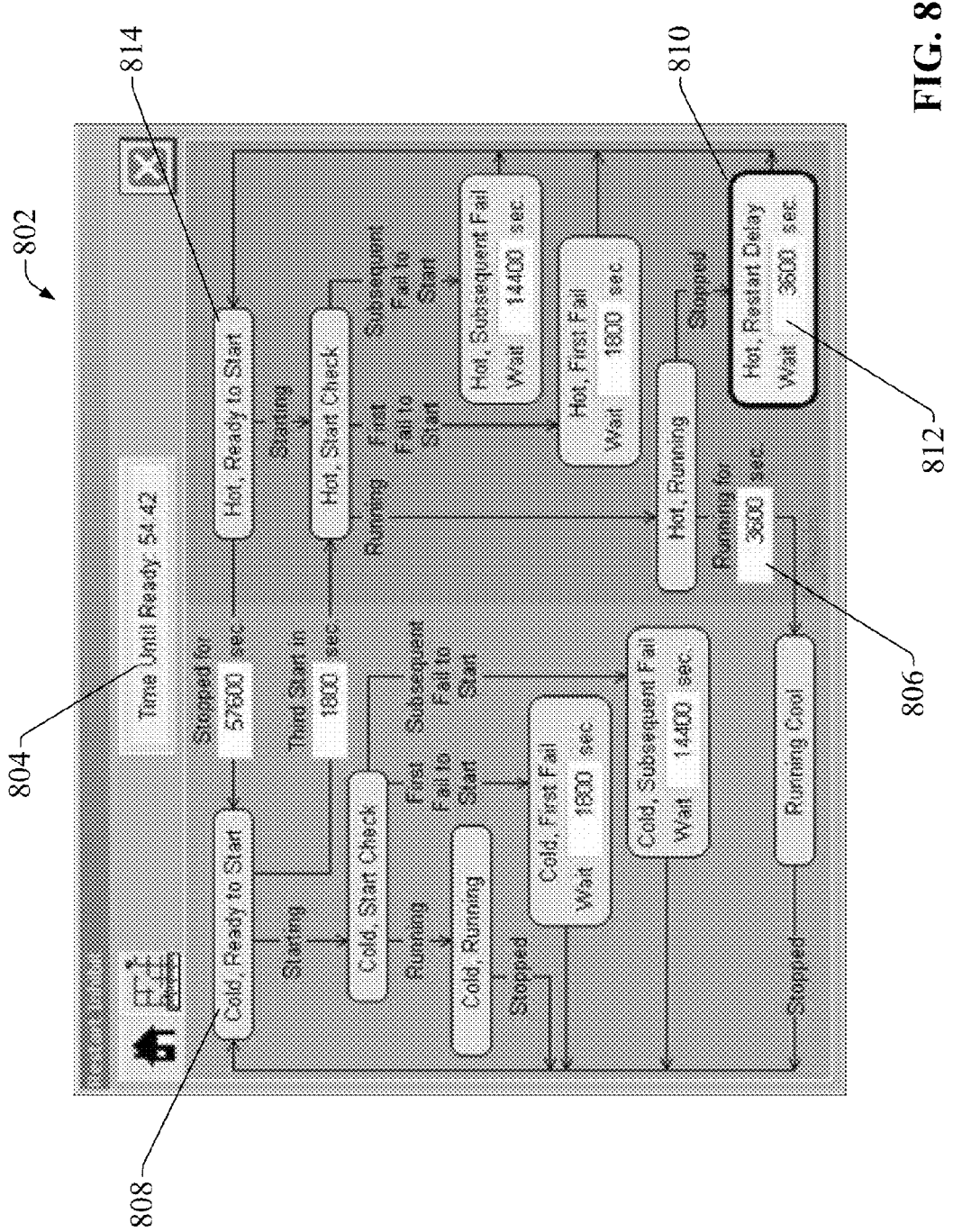
FIG. 8 illustrates an exemplary state diagram representation that depicts ready and running states for a pump (not ready state).

FIG. 8 illustrates another exemplary design diagram representation 802 for displaying pump restart conditions. Design diagram representation 802 can be invoked, for example, by selecting a graphic object representing the pump from an operator interface screen, and depicts a state diagram indicating a current running or readiness state for the pump. Accordingly, a number of possible states for the pump are represented by state icons 808 that include text strings describing the respective states. The icon 810 representing the current state of the pump is highlighted with a bold border and yellow fill. The arrows connecting the state icons 808 illustrate allowable state progressions through which the pump may traverse. The overall ready state for the pump is represented by ready status indicator 804.

Figure 9:
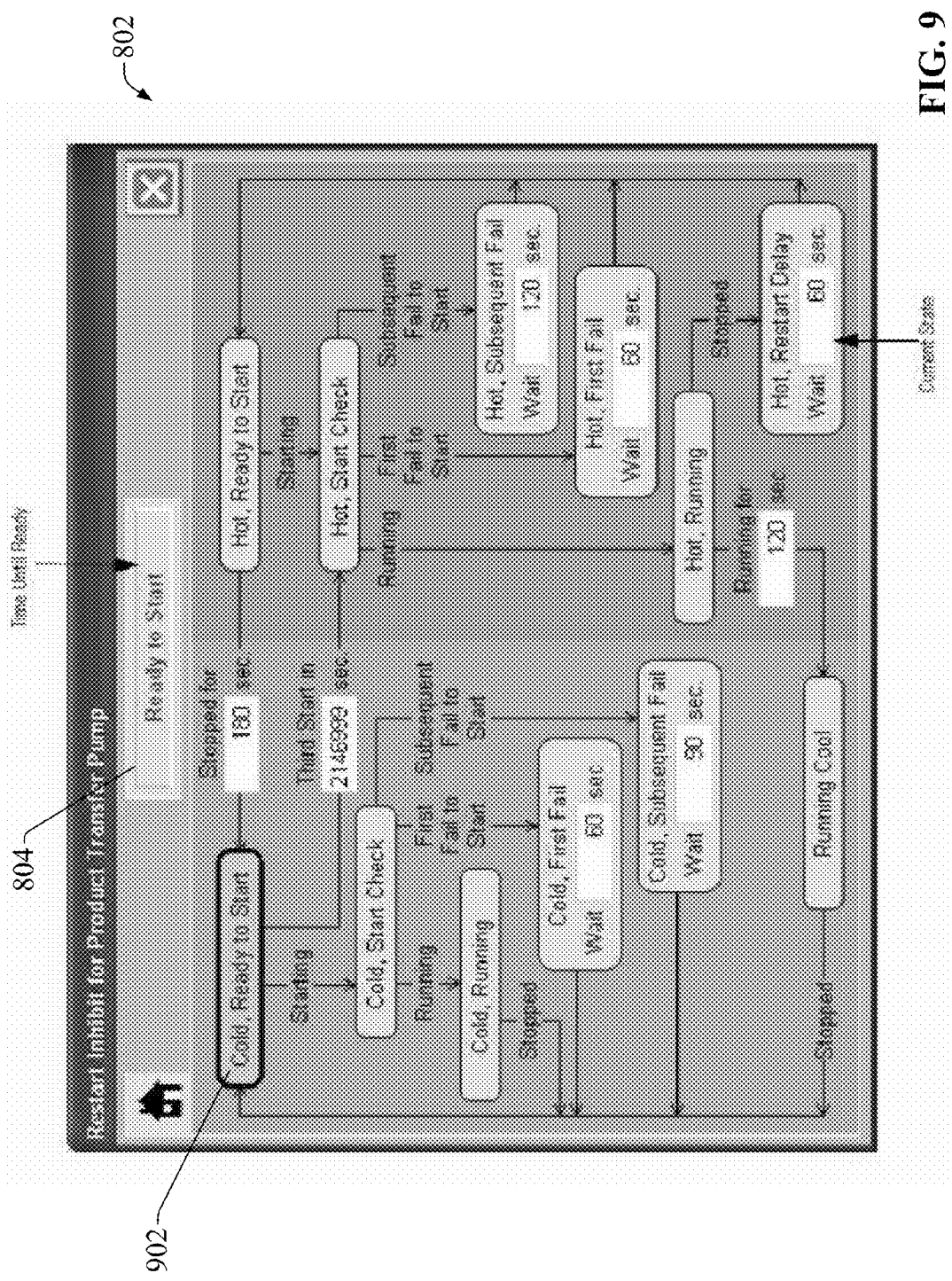
FIG. 9 illustrates an exemplary state diagram representation that depicts ready and running states for a pump (ready state).

Design diagram representation 802 also includes a number of user-configurable timers 806 that control state transitions for the pump. For example, if the pump switches to the "Hot, Restart Delay" state represented by icon 810, wait time 812 determines how long the pump must remain in that state before transitioning to the "Hot, Ready to Start" state represented by icon 814. While the pump is waiting for this wait time to elapse, ready status indicator 804 can display the time remaining until the pump will transition to the Ready state based on a comparison of an elapsed time with the configured wait time value. Similarly, configurable timer 806—representing a "Running for" time—controls how long the pump will remain in the "Hot, Running" state before transitioning to the "Running Cool" state. As depicted in FIG. 9, when the pump transitions to a "Ready" state (e.g., the "Cold, Ready to Start" state represented by icon 902), the ready status indicator 804 will display a "Ready to Start" message.

Similar to previous examples, design diagram representation 802 can be mapped to appropriate data structures in the industrial controller to facilitate populating the state diagram with near real-time state data from the controller. For example, design diagram representation 802 can be mapped to a device tag representing the pump and having a number of associated variables representing the various pump statuses. Alternatively, design diagram representation 802 may be mapped to a control function block that controls the pumps transitions through the various states.

Figure 10:
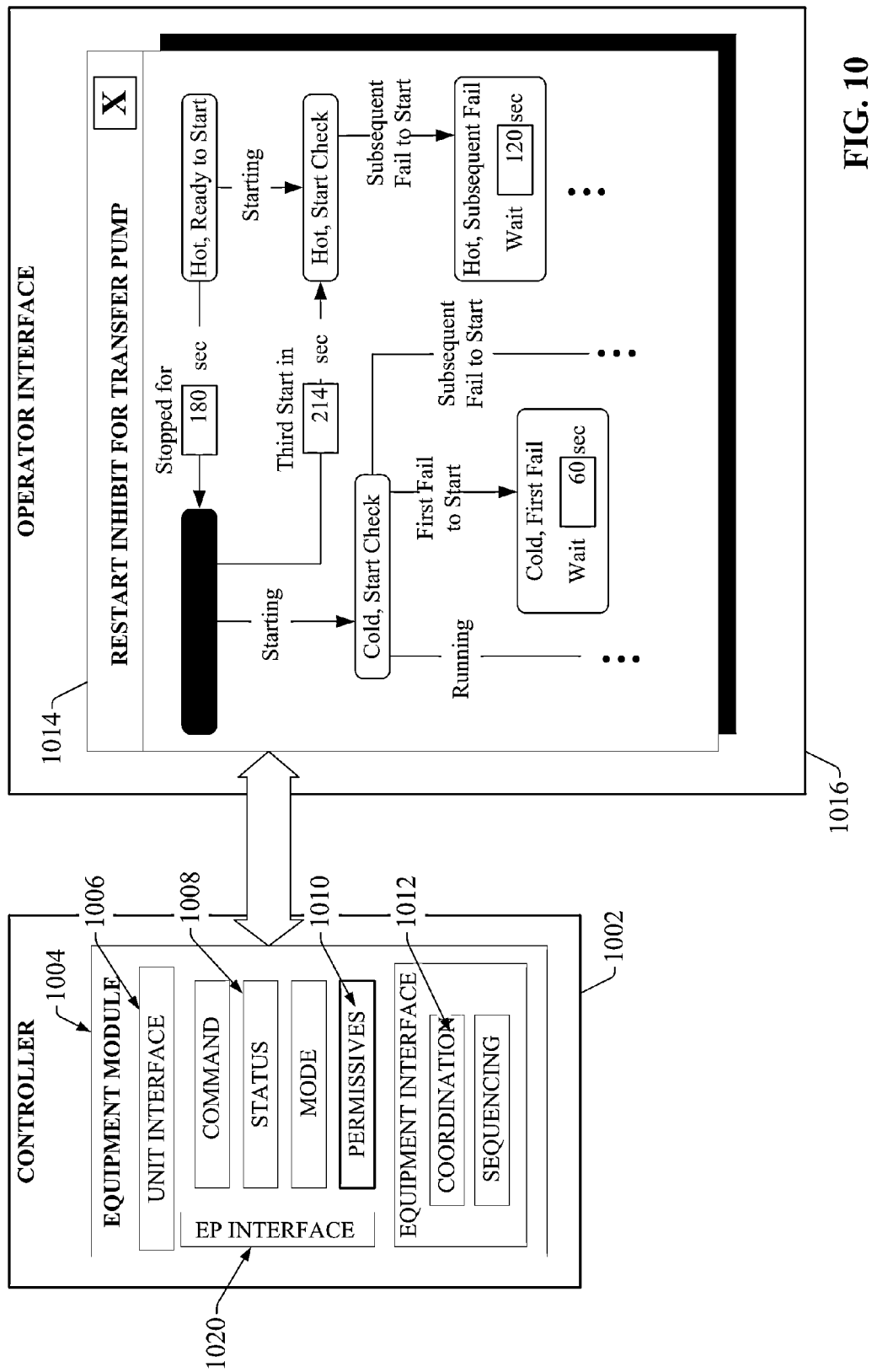
FIG. 10 illustrates mapping between and state diagram representation in an operator interface and an equipment module in an industrial controller.

In one or more embodiments, design diagram representations can be mapped to equipment modules deployed in the controller. FIG. 10 illustrates such a mapping between a design diagram representation 1014 and an equipment module 1004 that executes in industrial controller 1002. Such equipment modules are described in U.S. patent application Ser. No. 11/774,824, filed on Jul. 9, 2007, and incorporated herein by reference. Equipment module 1004 can sequence and coordinate equipment via one or more control modules (not shown). Equipment module 1004 can include an equipment interface 1012, a unit interface 1006, and an equipment phase (EP) interface 1020 that interacts with a respective equipment phase (not shown). The equipment module 1004 can also include components for commands, statuses, and modes (e.g., manual versus automatic, fault, reset) as shown at 1008, as well as a permissives component 1010, where the permissives define conditions that allow equipment associated with the equipment module 1004 to take actions.

In the operator interface 1016, design diagram representation 1014 can be mapped to the equipment module 1004 through any appropriate addressing or tagging method by the developer of the operator interface application. Thereafter, the design diagram representation 1014 can read, for example, the real-time status of permissives associated with a device from the permissives component 1010 of equipment module 1004, and render this status data on the design diagram representation in a manner similar to the examples described above. Although the example illustrated in FIG. 10 depicts the permissives being read from an equipment module, it is to be appreciated that any type of software module executing in industrial controller 1002 having permissives encoded therein can mapped to design diagram representation 1014, which can read and display the encoded permissives.

Figure 11:
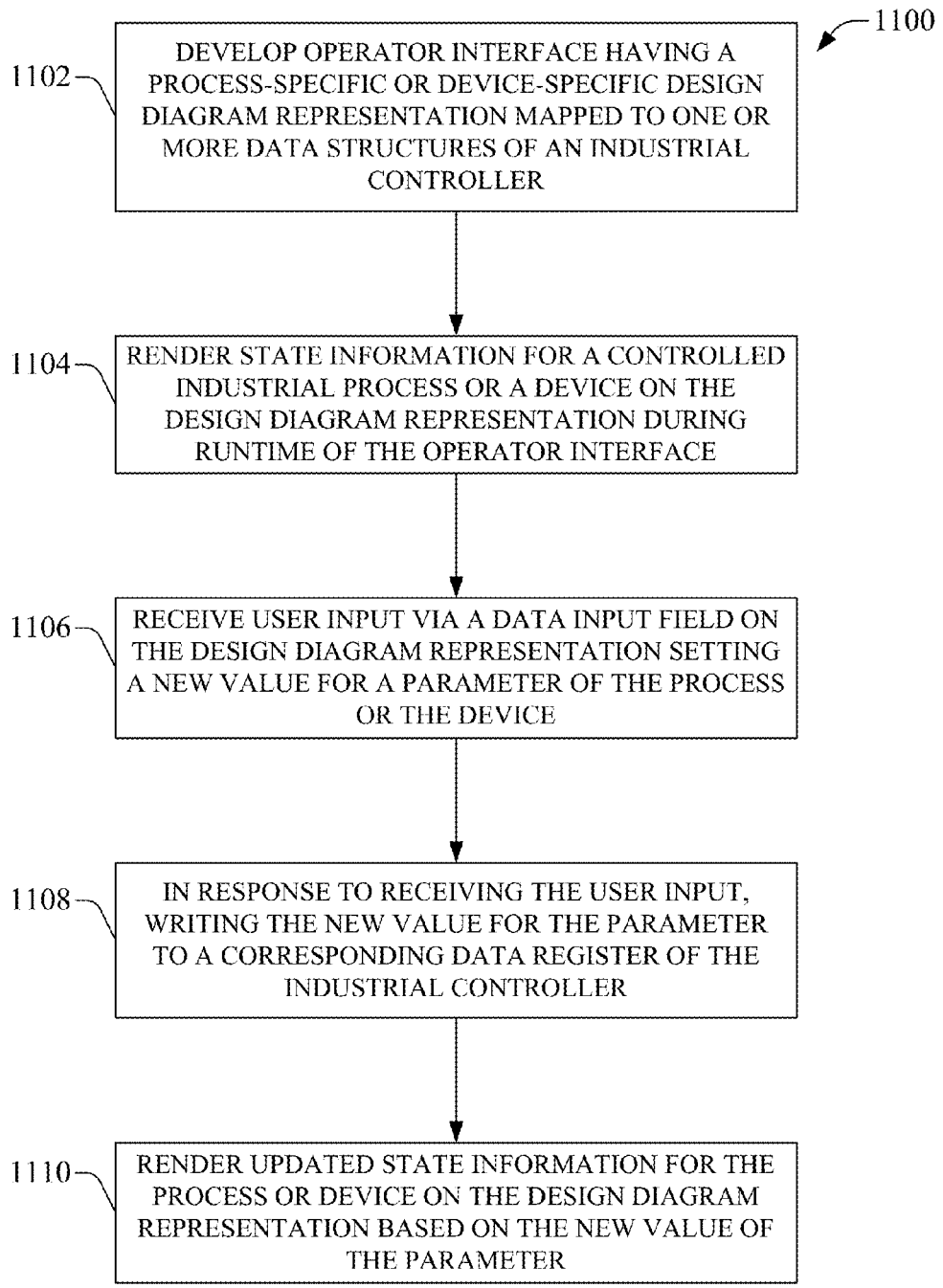
FIG. 11 is a flowchart of an example methodology for presenting and configuring an industrial process using a configurable design diagram representation.

FIG. 11 illustrates a methodology in accordance with one or more embodiments of the subject application. While, for purposes of simplicity of explanation, the one methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies.

FIG. 11 illustrates an example methodology 1100 for rendering near real-time state information for a controlled industrial process on a design diagram representation that allows user configuration of the process. Initially, at 1102, an operator interface is developed that includes a process-specific or device-specific design diagram representation that is mapped to one or more data structures of an industrial controller. At 1104, state information for a controlled industrial process or a device is rendered on the design diagram representation during runtime of the operator interface. At 1106, user input is received via a data input field on the design diagram representation that sets a new value for a parameter of the controlled process or device. At 1108, in response to receiving the user input via the design diagram representation, the new value for the parameter is written to a corresponding data register of the industrial controller. At 1110, updated state information for the process or device is rendered on the design diagram representation based in the new value of the parameter written to the controller.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, local area networks (LANs), wide area networks (WANs), proxies, gateways, routers, firewalls, virtual private network (VPN) devices, servers, clients, computers, configuration tools, monitoring tools, and/or other devices.

Figure 12:
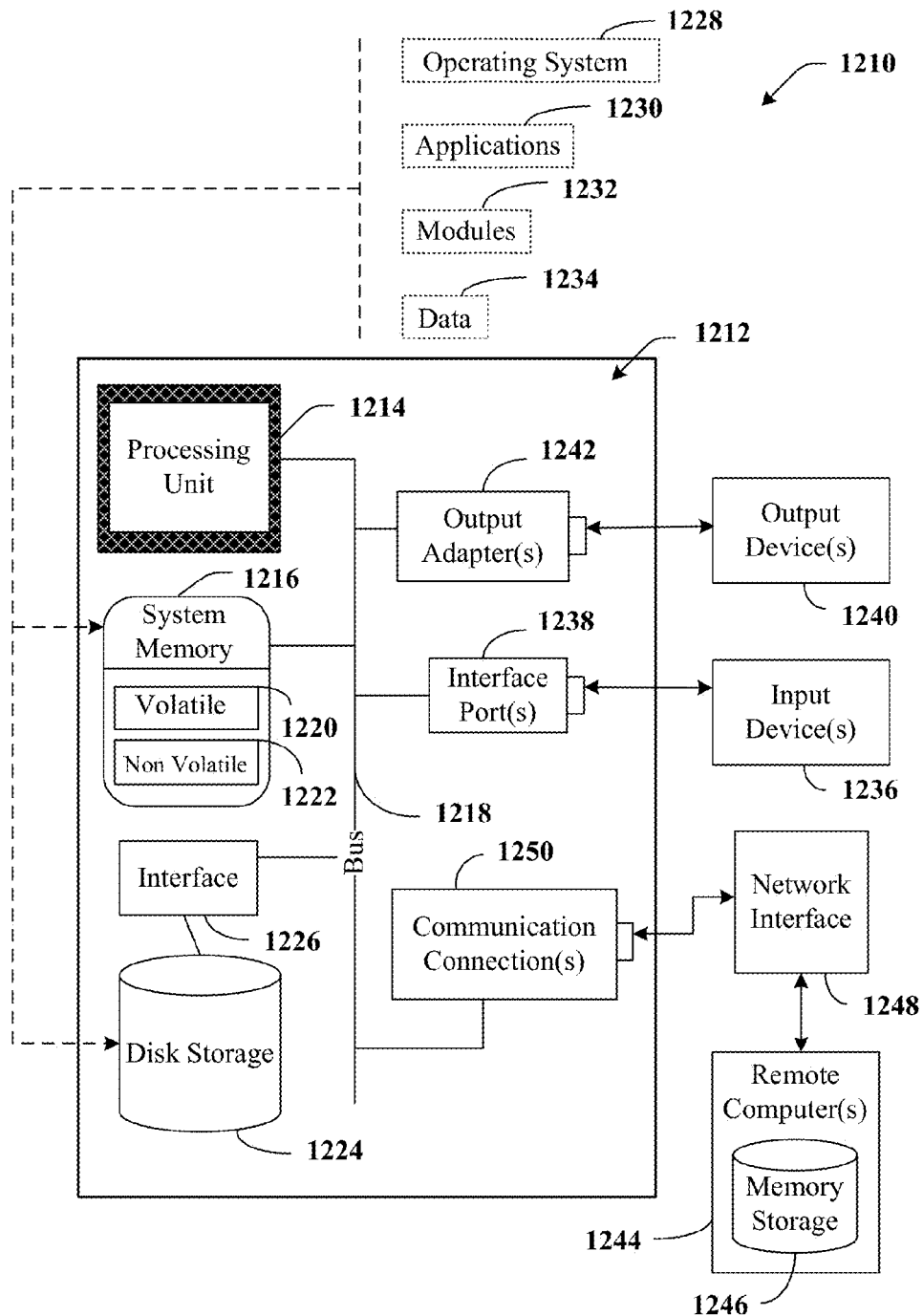
FIG. 12 is an example computing environment.
Figure 13:
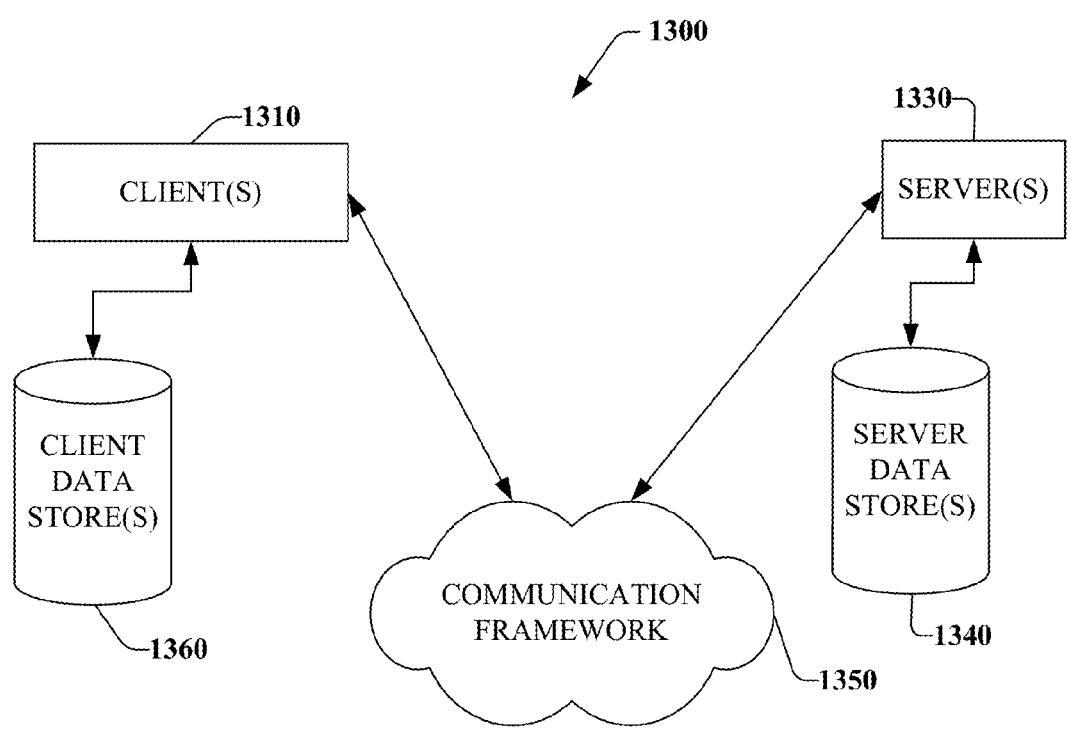
FIG. 13 is an example networking environment.

In order to provide a context for the various aspects of the disclosed subject matter, FIGS. 12 and 13 as well as the following discussion are intended to provide a brief, general description of a suitable environment in which the various aspects of the disclosed subject matter may be implemented.

With reference to FIG. 12, an example environment 1210 for implementing various aspects of the aforementioned subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Multi-core microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable PROM (EEPROM), or flash memory. Volatile memory 1220 includes random access memory (RAM), which acts as external cache memory. By way of illustration and not limitation, RAM is available in many forms such as synchronous RAM, static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer 1212. System applications 1230 take advantage of the management of resources by operating system 1228 through program modules 1232 and program data 1234 stored either in system memory 1216 or on disk storage 1224. It is to be appreciated that one or more embodiments of the subject disclosure can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the system bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

FIG. 13 is a schematic block diagram of a sample computing environment 1300 with which the disclosed subject matter can interact. The sample computing environment 1300 includes one or more client(s) 1310. The client(s) 1310 can be hardware and/or software (e.g., threads, processes, computing devices). The sample computing environment 1300 also includes one or more server(s) 1330. The server(s) 1330 can also be hardware and/or software (e.g., threads, processes, computing devices). The servers 1330 can house threads to perform transformations by employing one or more embodiments as described herein, for example. One possible communication between a client 1310 and a server 1330 can be in the form of a data packet adapted to be transmitted between two or more computer processes. The sample computing environment 1300 includes a communication framework 1350 that can be employed to facilitate communications between the client(s) 1310 and the server(s) 1330. The client(s) 1310 are operably connected to one or more client data store(s) 1360 that can be employed to store information local to the client(s) 1310. Similarly, the server(s) 1330 are operably connected to one or more server data store(s) 1340 that can be employed to store information local to the servers 1330.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

The invention claimed is:

1. A system for displaying state information for an industrial process, comprising:
   a processor; and
   a memory communicatively coupled to the processor, the memory having stored therein computer-executable instructions configured to implement components of the system, the components comprising:
   an operator interface component configured to execute an operator interface application that displays control data associated with an industrial process,
   wherein
   the operator interface component is further configured to, in response to receipt of selection input that selects a graphical representation of a device comprising the industrial process, render a design diagram template that displays a set of possible states for the device and indicates one state, of the set of possible states, representing an active state of the device,
   the design diagram template controls highlighting of a connecting line between at least two states of the possible states based on status data read from a data structure of an industrial controller, and
   the design diagram comprises at least one numeric entry field configured to receive input data that sets a corresponding at least one parameter that determines a state of the device.

2. The system of claim 1, wherein the components further comprise a mapping component configured to receive configuration data that maps a status display graphic object of the design diagram template to the data structure of the industrial controller.

3. The system of claim 2, wherein the data structure is at least one of a data tag, a function block, or an equipment module.

4. The system of claim 1, wherein the design diagram template displays at least one of a process variable, a control variable, a target process variable, a gate status, a device running status, or a device ready status.

5. The system of claim 1, wherein the at least one numeric entry field includes an entry field for at least one of a delay time, a setpoint value, a run time, a clamping limit, a scaling range, an alarm threshold, a data entry range, or a rate of change limit.

6. The system of claim 1, wherein the components further comprise a graphic object library that stores a plurality of design diagram templates including the design diagram template.

7. The system of claim 6, wherein the graphic object library classifies the plurality of design diagram templates according to at least one of an industry, a type of industrial process, or a type of device.

8. The system of claim 1, wherein the state diagram displays status data for the device, and wherein the status data is displayed as at least one of a numeric indicator, a string indicator, a color-coded text box, or a highlight.

9. The system of claim 1, wherein the design diagram template further displays one or more conditions for transitioning between at least two of the possible states.

10. A method for viewing and configuring an industrial process via an animated state diagram, comprising:
- receiving, by a system comprising at least one processor, selection input indicating a selection of a graphical representation of an industrial device on an operator interface;
- displaying, by the system in response to the receiving the selection input, a state diagram for the industrial device displaying multiple possible states defined for the device;
- indicating, by the system on the state diagram, one of the multiple possible states as a current state of the industrial device;
- setting, by the system on the state diagram, a highlight graphic of a connecting line between at least two states of the possible states based on status data read from at least one of a data tag, a function block, or an equipment module of an industrial controller;
- receiving, by the system in response to interaction with the state diagram, configuration input specifying a numeric value of a process parameter of an industrial process comprising the industrial device; and
- writing, by the system in response to the receiving the configuration input, the numeric value to a register of the industrial controller, wherein the register corresponds to the process parameter.

11. The method of claim 10, further comprising mapping at least one status display object of the state diagram to at least one of the data tag, the function block, or the equipment module of the industrial controller.

12. The method of claim 10, further comprising rendering, on the state diagram, at least one of a process variable, a control variable, a target process variable, a gate status, a device running status, or a device ready status.

13. The method of claim 10, wherein the receiving the configuration input comprises receiving, as the numeric value, at least one of a delay time, a setpoint value, a run time, a clamping limit, a scaling range, an alarm threshold, a data entry range, or a rate of change limit.

14. The method of claim 10, further comprising maintaining the state diagram in a library of state diagrams available for display on the operator interface, wherein the library of state diagrams classifies the state diagrams according to at least one of an industry, a type of industrial process, or a type of device.

15. The method of claim 10, further comprising rendering, on the state diagram, live status data for the industrial device as at least one of a numeric indicator, a string indicator, a color-coded text box, or a connecting line highlight.

16. The method of claim 10, wherein the displaying comprises displaying one or more conditions for transitioning between at least two of the multiple possible states.

17. A non-transitory computer-readable medium having stored thereon computer-executable instructions that, in response to execution, cause a computing system to perform operations, the operations including:
- receiving, in response to interaction with an operator interface, selection input indicating a graphical representation of an industrial device on the operator interface;
- in response to the receiving, displaying, on a design diagram representation, a set of possible states for the industrial device and an indication of which of the possible states is active;
- altering a highlight of a connecting line of the design diagram representation based in part on state data read from an industrial controller;
- receiving, via the design diagram representation, configuration input that sets or changes a value of a process variable of an industrial process to yield a new value; and
- in response to the receiving the configuration input, writing the new value to a data structure of the industrial controller.

18. The non-transitory computer-readable medium of claim 17, further comprising classifying a plurality of design diagram representations, including the design diagram representation, in a graphic object library of an operator interface according to at least one of an industry, a type of industrial process, or a device type.

19. The non-transitory computer-readable medium of claim 17, further comprising rendering, on the design diagram representation, at least one of a process variable, a control variable, a target process variable, a gate status, a device running status, or a device ready status.

20. The non-transitory computer-readable medium of claim 17, wherein the receiving the configuration input comprises receiving, as the configuration input, at least one of a delay time, a setpoint value, a run time, a clamping limit, a scaling range, an alarm threshold, a data entry range, or a rate of change limit.

* * * * *